United States Patent [19]
Wreede et al.

[11] Patent Number: 5,602,656
[45] Date of Patent: Feb. 11, 1997

[54] APPARATUS AND METHOD FOR MONITORING HOLOGRAPHIC LIGHT PROTECTION FILTERS

[75] Inventors: John E. Wreede, Azusa; Richard B. Upper, Sherman Oaks, both of Calif.; Darrell F. Hatch, Sedro Woolley, Wash.; Lane W. Cosner, Cave Junction, Oreg.; Stephen T. Babbitt, Redondo Beach, Calif.

[73] Assignee: Hughes Electronics, Los Angeles, Calif.

[21] Appl. No.: 353,576

[22] Filed: Dec. 9, 1994

[51] Int. Cl.⁶ ........................................ G03H 1/02
[52] U.S. Cl. .................... 359/3; 359/1; 359/15; 356/347
[58] Field of Search .................. 359/1, 3, 15, 27, 359/507, 511, 512; 356/347, 402, 407

[56] References Cited

U.S. PATENT DOCUMENTS 4,789,211  12/1988  Wreede ........................... 359/3
5,172,250  12/1992  Tsuchiya et al. ................. 359/1

*Primary Examiner*—Paul M. Dzierzynski
*Assistant Examiner*—Darren E. Schuberg
*Attorney, Agent, or Firm*—Leonard A. Alkov; Wanda K. Denson-Low

[57] ABSTRACT

Method and apparatus for monitoring wavelength shift in a holographic light protection filter to determine if the hologram has been damaged by moisture. The hologram is provided with first, second and third areas. The first area is an extra moisture protected area covered by a moisture resistant material. The second area is adjacent to the first area and is recorded at a different wavelength than the bulk of the hologram. The third area is the remainder of the hologram. The user compares light reflections at these specific areas of the hologram and observes color variations to determine if the hologram has been damaged by moisture. In another embodiment, scribe lines are drawn in the hologram through the three areas. The user detects moisture damage by observing the apparent displacement of these scribe lines in the three areas when viewed through a diffraction grating.

14 Claims, 1 Drawing Sheet

APPARATUS AND METHOD FOR MONITORING HOLOGRAPHIC LIGHT PROTECTION FILTERS

BACKGROUND OF THE INVENTION

In the field of optics, the use of holograms as filters has been recognized as an effective way to protect eyes, instruments, and/or detectors from damaging narrow wavelength band light rays, such as light being encountered from a laser beam.

A typical hologram is constructed from a layer of photoreactive gelatin on a substrate exposed to laser beams. The laser beams set up an interference pattern which is recorded in the gelatin as a sinusoidal modulation in the index of refraction of the gelatin. This pattern of modulations defines a hologram. By suitable control of the lasers used to generate the hologram, the degree of reflectivity and transmissivity of the hologram can be selectively determined and a cone of total reflection for a given wavelength can be provided.

A hologram intended for use in a light protection device is designed to diffract and redirect harmful rays of light out of a user's field of view. It is important that such a hologram maintain over time the same degree of reflectivity at the peak wavelength as that originally recorded so that the cone of total reflection remains essentially the same for effectively diffracting the anticipated harmful light rays.

However, moisture coming in contact with a holographic gelatin substrate can change the degree of reflectivity at the peak wavelength and produce a wavelength shift or drift. Materials have been found that protect the hologram from moisture for up to a year at high efficiency. However, protective coatings are often fragile and a system for verifying their effectiveness is desirable. Glass has been shown to be effective and can be used to provide a standard for comparison, but it is generally undesirable for covering the entire hologram due to weight and safety considerations.

Previous efforts have concentrated on eliminating the moisture problem, rather than monitoring it. A spectrophotometer can measure actual transmission of the hologram, but it lacks portability. Special devices with bandpass filters of the proper wavelength also can be useful for monitoring purposes, but they would require some expertise to use, as well as periodic calibrations and upkeep. Other devices have been postulated using either a narrow bandpass filter of the proper shape and wavelength, or two narrow filters at the 50% points applied to the surface of the hologram substrate. In the first case, an excess of visible light would signal that the wavelength had shifted too much, and in the second case, more light through one filter than through the other would indicate the presence of moisture damage. In both cases, user judgment comes into play, and although standards could be built into the device, it is not entirely satisfactory. Furthermore, producing the proper narrow band filters could cause production problems.

A need exists for a convenient method of visually monitoring the condition of the hologram using a device built right into the light protection device.

SUMMARY OF THE INVENTION

The present invention provides a built-in method and apparatus which allows the user to quickly determine by visual inspection if the hologram in a light protection device has undergone damage due to moisture absorption. The apparatus of the present invention is relatively inexpensive to manufacture, is trouble-free and reliable to use.

The apparatus is preferably used with a dichromate gelatin reflection type hologram covered in plastic on both sides as a standard moisture barrier. The hologram has a prerecorded narrow band cone of total reflection at or near the wavelength of anticipated damaging light so as to reflect and redirect the damaging light rays away from the user's eyes.

In a preferred form, the apparatus consists of a small sheet of moisture resistant material disposed internal of the plastic hologram covering for extra-moisture protection in a selected region of the hologram. This extra-moisture protected area is used as a first standard for monitoring the condition of the hologram.

A second standard is an area on the hologram, adjacent to the first standard, having a recorded wavelength different than the recorded wavelength of the rest of the hologram. In practice, the user merely looks at a light reflection in the locality of the two standards. If the user sees one spot of different color, the hologram's condition is unchanged, the spot he sees corresponding to the second standard having a recorded wavelength different from the rest of the hologram. Seeing the one spot also indicates that the user's eyers are sufficiently sensitive to the color variations. If the user sees two spots, it indicates that the bulk of the hologram has changed in wavelength from how it was originally recorded. The first spot he sees is from the second standard previously described. The second spot corresponds to the first standard having the extra-moisture protected area. The rest of the hologram having been damaged by moisture and no longer having the originally recorded wavelength exhibits a change in wavelength (color) with respect to the extra-protected spot.

For applications where greater sensitivity is desired or where the viewer is color blind, an alternative embodiment provides two index lines drawn on the hologram through the two standards and the adjacent hologram area. A diffraction grating is positioned on the surface of the hologram cover and a small short focal length lens is put on top of the diffraction grating. The user is able to determine if the wavelength of the hologram has shifted by looking for an apparent shift in the position of the lines. The diffraction grating offsets segments of the index lines corresponding to the area through which the index lines run. Thus, index lines offset only where the index lines run through the intentionally shifted second standard indicate that the hologram has not been damaged by moisture. Index lines offset where they run through the area having extra-moisture protection indicate that the hologram filter has been damaged by moisture, since the wavelength of the remainder of the hologram has shifted relative to the extra-protected spot.

Other features and advantages of the present invention will become apparent from the following detailed description taken in conjunction with the accompanying drawings which illustrate by way of example the principles of the invention.

DETAILED DESCRIPTION OF THE PREFERRED EMBODIMENTS

In making a typical hologram, a layer of photoreactive gelatin on a substrate is exposed to intersecting beams of coherent light, such as laser beams, entering the gelatin from opposite sides. The laser beams set up an interference pattern which is recorded in the gelatin as a sinusoidal modulation in the index of refraction of the gelatin. A pattern of holographic fringes corresponding to the refractive index modulation defines a reflection hologram. After exposure, the gelatin is subjected to a number of processing steps which are well known in the art.

By suitable control of the lasers used to generate the hologram, the degree of reflectivity and transmissivity of the hologram can be selectively determined and a cone of a total reflection for a given wavelength can be provided. However, moisture can shift the recorded wavelength of a hologram's cone of total reflectivity, thereby allowing damaging rays previously reflected to now pass through the hologram. The present invention is preferably embodied in a holographic light protection shield which uses a narrow band rejection filter for laser eye protection. The invention provides a method and apparatus for monitoring wavelength shift due to moisture damage.

Figure 1:
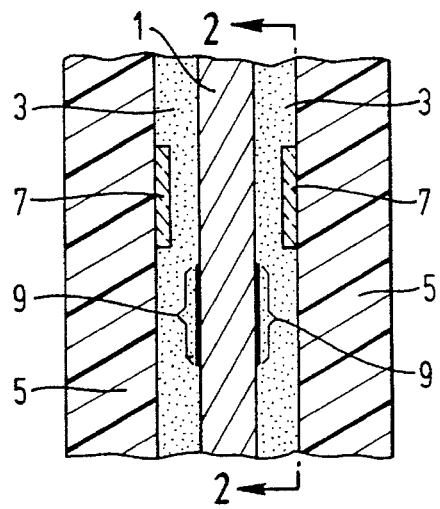
FIG. 1 is an enlarged, fragmentary cross-section of a holographic light protection device incorporating features of the present invention.

Referring to FIG. 1, a reflection type hologram peaked at or near the wavelength of the light to be diverted is recorded in a layer 1 of dichromated gelatin disposed between layers of glue 3 and a covering of thin plastic (e.g. 0.006") 5 on each side. Small pieces of moisture resistant material 7, such as a glass covering in the form of small square pieces of approximately 0.005" thick microsheet glass, are located internal of the plastic covering 5 each side of the gelatin layer 1 over a small portion of the hologram to provide extra protection from moisture.

Figure 2:
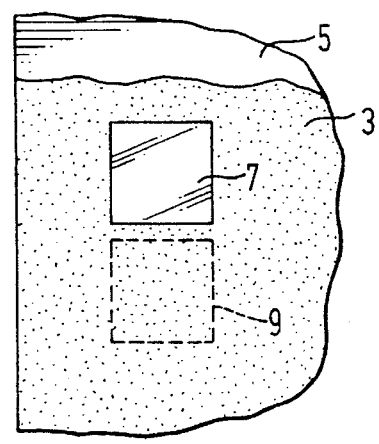
FIG. 2 is a fragmentary, schematic plan view of the apparatus shown in FIG. 1.

As shown schematically in FIG. 2, a small area 9 of the hologram adjacent to the moisture resistant material 7, is recorded at a different wavelength than the rest of the hologram. This preferably is accomplished by placing a small wedge or prism in the optical path in that area during construction of the hologram, or by other known techniques. An alternative approach is to place a small drop of swelling material, such as triethanol amine, on that area immediately prior to exposure. The preferred amount of the wavelength shift is on the order of about 2 nm. The difference in wavelength enables the user of the device to gauge any further wavelength shift due to moisture penetration by observing color variations among the various regions 7 and 9.

In one embodiment, the invention is used in a holographic protection visor which may be used by a pilot to protect the pilot's eyes from damaging light rays. In this embodiment, the area 7 of extra-moisture protection and area 9 having a different peak wavelength than the rest of the visor are located in a corner of the visor outside of the pilot's primary field of vision so as not to obstruct his normal view.

The construction described above is useful for applications where the allowable moisture-induced wavelength shift is relatively large, such as 10 nm. In using the invention in such applications, the inspector merely focuses his eyes at light reflections from the two areas 7 and 9. If the holographic filter is unchanged from its originally recorded state, he will see (if his eyesight is sufficient) a spot of different color at the location of the deliberately shifted spot 9, as compared to the color of the extra-moisture protected spot 7 and the rest of the hologram.

If the holographic filter is changed from its originally recorded state due to moisture penetration, the inspector will see a second spot of another color corresponding to the location of the extra-moisture protected area 7. This is due to the fact that the rest of the hologram (including the deliberately shifted spot 9) has shifted in wavelength relative to the portion of the hologram under the protected area 7 due to moisture damage.

Under normal conditions, the inspector should see one or two spots. If he sees no spots, either lighting conditions are bad or he has some degree of color blindness. Observation of the spots informs the inspector whether there has been a relative shift in wavelength, but does not always test for absolute suitability. Thus, a visor which has been subjected to excessive heat for a long time might test positive, but in actuality provide little or no protection.

Figure 3:
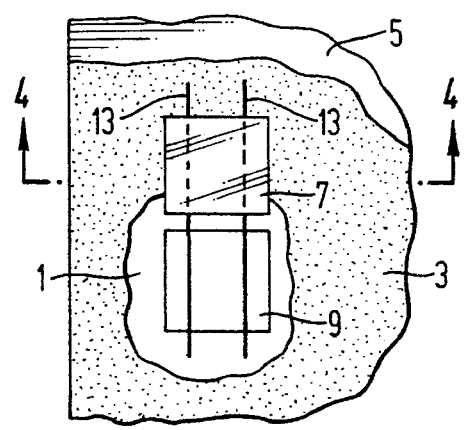
FIG. 3 is a fragmentary, schematic plan view of another embodiment of the invention.
Figure 4:
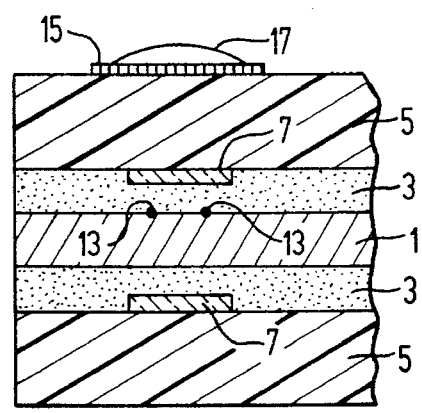
FIG. 4 is an enlarged, fragmentary, cross-section of the apparatus shown in FIG. 3, taken along the line 4—4.
Figure 5:
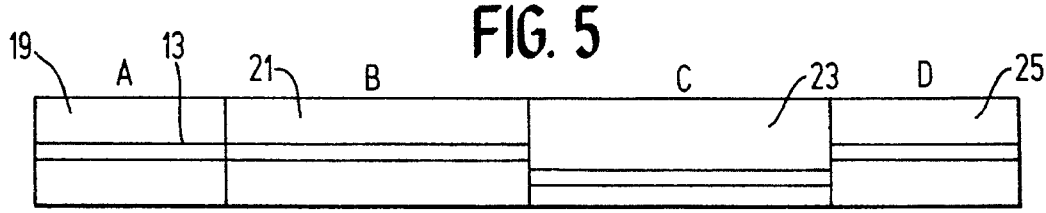
FIG. 5 is a schematic view of the visual appearance of the scribe lines shown in FIGS. 3 and 4 with an effective protective shield.
Figure 6:
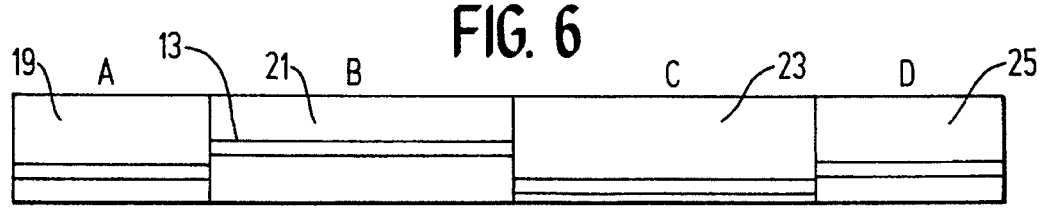
FIG. 6 is a schematic view of the visual appearance of the scribe lines show in FIGS. 3 and 4 with an ineffective protective shield.

Under some conditions, the direct viewing color change method may not be considered adequate, either because the wavelength shift is too small or the inspector is not able to distinguish any differences in color. Thus, in another embodiment of the invention, FIG. 3, two index or scribe lines 13 are drawn in the hologram recording media 1 through the area 7 under the moisture resistant material and the area 9 of the hologram having the differently recorded wavelength, as well as in the adjacent areas of the hologram. As shown in FIG. 4, where like reference numbers indicate identical components to those shown in FIG. 1, a diffraction grating 15 is disposed on the surface of the hologram covering 5 over the region of the two areas 7 and 9, and a small, short focal length lens 17 (such as molded cylindrical lens) is placed on top of the diffraction grating 15. FIGS. 5 and 6 illustrate what the inspector will see without and with a moisture-induced wavelength shift, respectively.

In FIG. 5, block A 19 represents the bulk of the hologram 1; block B 21 represents the area protected by the moisture resistant material 7; block C 23 represents the area 9 having an intentionally shifted wavelength from the remainder of the hologram during construction, and block D 25 is also representative of the bulk of the hologram. Although the two scribe lines 13 are physically straight and unbroken, they appear to have discontinuities in the intentionally shifted area 9 (block 23) due to a diffractive bending at different wavelengths. The relationship between the scribe lines in blocks A, C and D does not change. However, the relationship between the lines in block B and the lines in the other blocks A, C and D will become offset as blocks A, C and D are affected by moisture, as seen in FIG. 6. It is also possible to determine the quantative amount of wavelength shift by comparing the offset to a known offset between blocks C and D, which may be for example 2 nm.

From the foregoing, it will be appreciated that the method and apparatus of the invention allows the user to monitor the effectiveness of a hologram in a holographic light protection filter, providing maximum safety to the user against damaging light rays. Further, the system is portable, easily used and inexpensive to manufacture.

While several particular embodiments of the invention have been illustrated and described, it will be apparent that various modifications can be made without departing from the spirit and scope of the invention. Finally, it is not intended that the invention be limited except as by the appended claims.

What is claimed is:

1. Apparatus for monitoring holographic filters comprising:
a hologram having first, second and third areas, said first area having extra moisture protection, said second area being recorded at a different wavelength than said first area and the remainder of the hologram, and said third area including a portion of the hologram outside of said first and second areas.

2. Apparatus as set forth in claim 1, wherein said first area includes a piece of micro-sheet glass.

3. Apparatus as set forth in claim 1, wherein said hologram is a dichromate gelatin reflection type hologram.

4. Apparatus as set forth in claim 1, wherein said second area is recorded at a wavelength 2 nm different than said first and third areas.

5. Apparatus as set forth in claim 1, wherein said hologram at said first, second and third areas has scribe lines drawn therein, and further including a diffraction grating aligned with said scribe lines.

6. Apparatus for monitoring holographic filters comprising a hologram, one or more index lines drawn in said hologram, and a diffraction grating aligned with said index lines.

7. Apparatus as set forth in claim 6, wherein said hologram has first and second areas, said first area having extra moisture protection, and said second area being recorded at a different wavelength than said first area.

8. Apparatus as set forth in claim 7, further comprising a lens aligned with said diffraction grating.

9. Apparatus for monitoring holographic filters, comprising:
a dichromate gelatin reflection hologram having first, second and third areas, a layer of adhesive with a covering on each side of said hologram, said first area having extra moisture protection, said second area being recorded at a different wavelength than said first area and the remainder of said hologram, and said third area including a portion of the hologram outside of said first and second areas.

10. Apparatus as set forth in claim 9, wherein said first and second areas are located outside of a user's field of view.

11. Apparatus as set forth in claim 10, wherein said second area is recorded at a wavelength about 2 nm different than said first and third areas.

12. A method for monitoring a holographic light protection device comprising viewing light reflection from a first extra moisture protected area of a hologram in said light protection device and comparing said area with a second area of said hologram not extra moisture protected.

13. The method as set forth in claim 12, including comparing the apparent location of scribe lines drawn through said first and second areas viewed through a diffracting grating.

14. The method as set forth in claim 12, including comparing the color of light reflecting from said first and second areas.

* * * * *